(12) United States Patent
Ramsland et al.

(10) Patent No.: US 12,368,685 B2
(45) Date of Patent: Jul. 22, 2025

(54) PLUGGABLE PATCH PANEL

(71) Applicant: CREDO TECHNOLOGY GROUP LTD, Grand Cayman (KY)

(72) Inventors: Thor Ramsland, Woodbine, MD (US); Chris Collins, Ottawa (CA); Donald Barnetson, Campbell, CA (US)

(73) Assignee: CREDO TECHNOLOGY GROUP LTD, Grand Cayman (KY)

( * ) Notice: Subject to any disclaimer, the term of this patent is extended or adjusted under 35 U.S.C. 154(b) by 217 days.

(21) Appl. No.: 18/181,385

(22) Filed: Mar. 9, 2023

(65) Prior Publication Data

US 2024/0305585 A1 Sep. 12, 2024

(51) Int. Cl.
*H01L 21/00* (2006.01)
*H04L 49/15* (2022.01)
*H04L 49/45* (2022.01)

(52) U.S. Cl.
CPC .............. *H04L 49/45* (2013.01); *H04L 49/15* (2013.01)

(58) Field of Classification Search
CPC ................................ H04L 49/45; H04L 49/15
See application file for complete search history.

(56) References Cited

U.S. PATENT DOCUMENTS

| | | | |
|---|---|---|---|
| 8,902,732 B2 | 12/2014 | Van Gruenen et al. | |
| 11,218,407 B2 | 1/2022 | Ramsland | |
| 11,595,302 B2 | 2/2023 | Ramsland et al. | |
| 11,942,730 B2 | 3/2024 | Chen et al. | |
| 2010/0115295 A1* | 5/2010 | Diab | G06F 1/3234 713/300 |
| 2011/0267775 A1* | 11/2011 | VanDerVeen | H05K 7/20736 361/692 |
| 2012/0091685 A1* | 4/2012 | McAndrews | B62K 25/04 280/283 |
| 2013/0163425 A1 | 6/2013 | Hughes et al. | |
| 2016/0091685 A1* | 3/2016 | Raza | H04Q 11/0066 398/19 |
| 2017/0019176 A1* | 1/2017 | Ward | H04B 10/2972 |
| 2019/0264743 A1* | 8/2019 | Hoppe | F16C 33/208 |
| 2023/0394003 A1 | 12/2023 | Qian et al. | |

* cited by examiner

*Primary Examiner* — Samina F Choudhry

(57) ABSTRACT

Devices and methods to correct for a mismatch in network port capabilities of a network component and the desired active network cable or pluggable transceiver capabilities, whether that mismatch relates to the power envelope, the thermal envelope, the bandwidth, or the signal constellation. For example, a pluggable patch panel is provided that may take the form of a modular rack unit component that can be connected between the desired active cable connectors or optical transceivers and the overmatched network ports of an existing router or other network component to meet the requirements for the desired connectors/transceivers while ensuring full utilization of the existing component's capabilities. In at least some cases, the pluggable patch panel minimizes cost and complexity by connecting associated ports with direct-connect traces that comply with the relevant chip-to-module attachment unit interface (AUI C2M) loss specifications of the IEEE 802.3 (Ethernet) Standard.

21 Claims, 5 Drawing Sheets

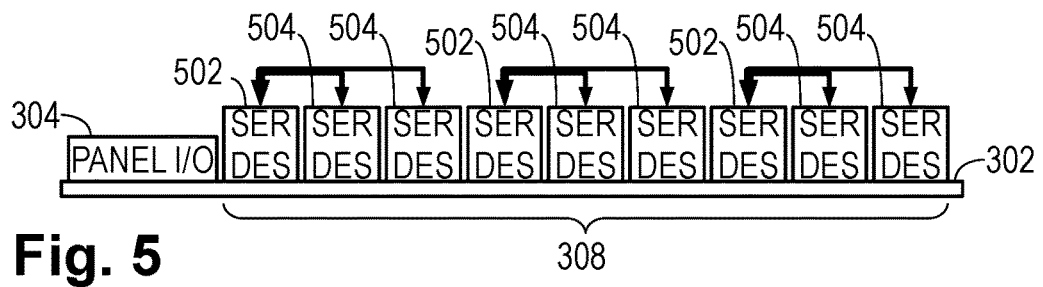
Fig. 5
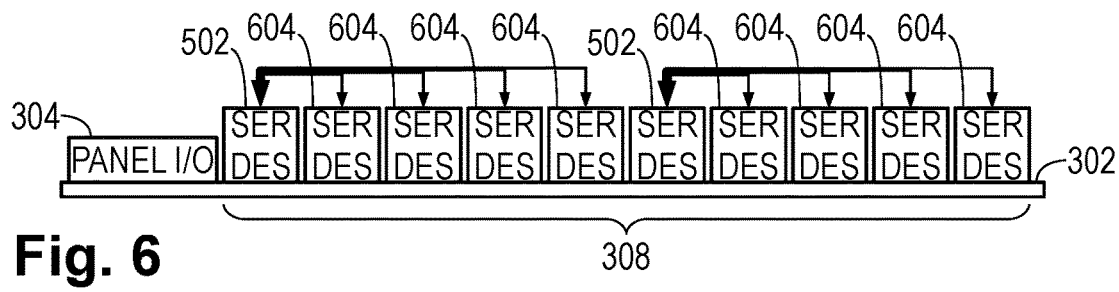
Fig. 6
Fig. 7
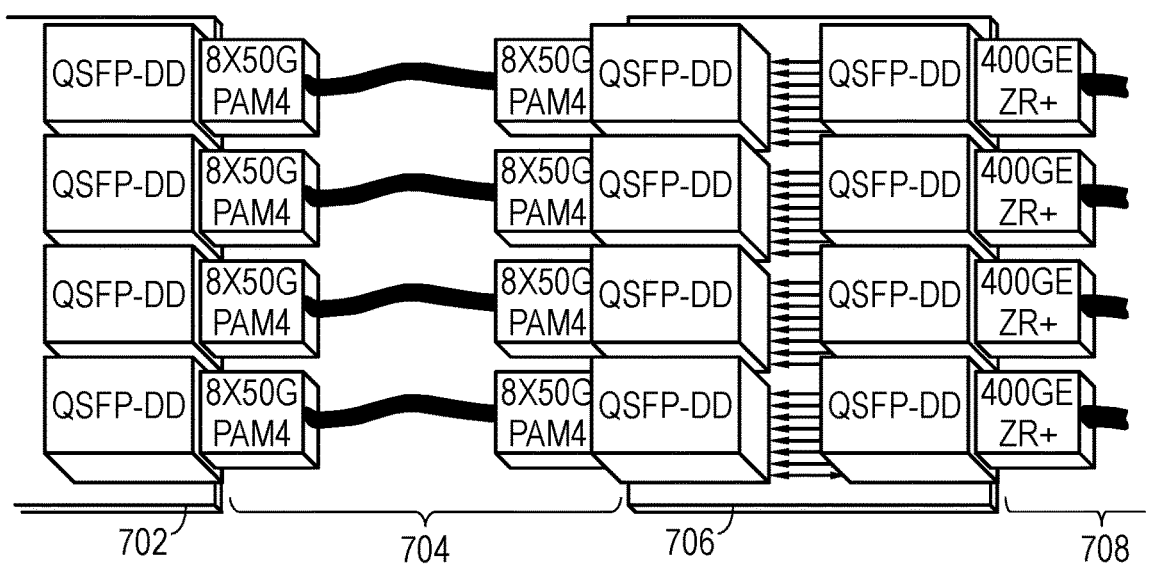

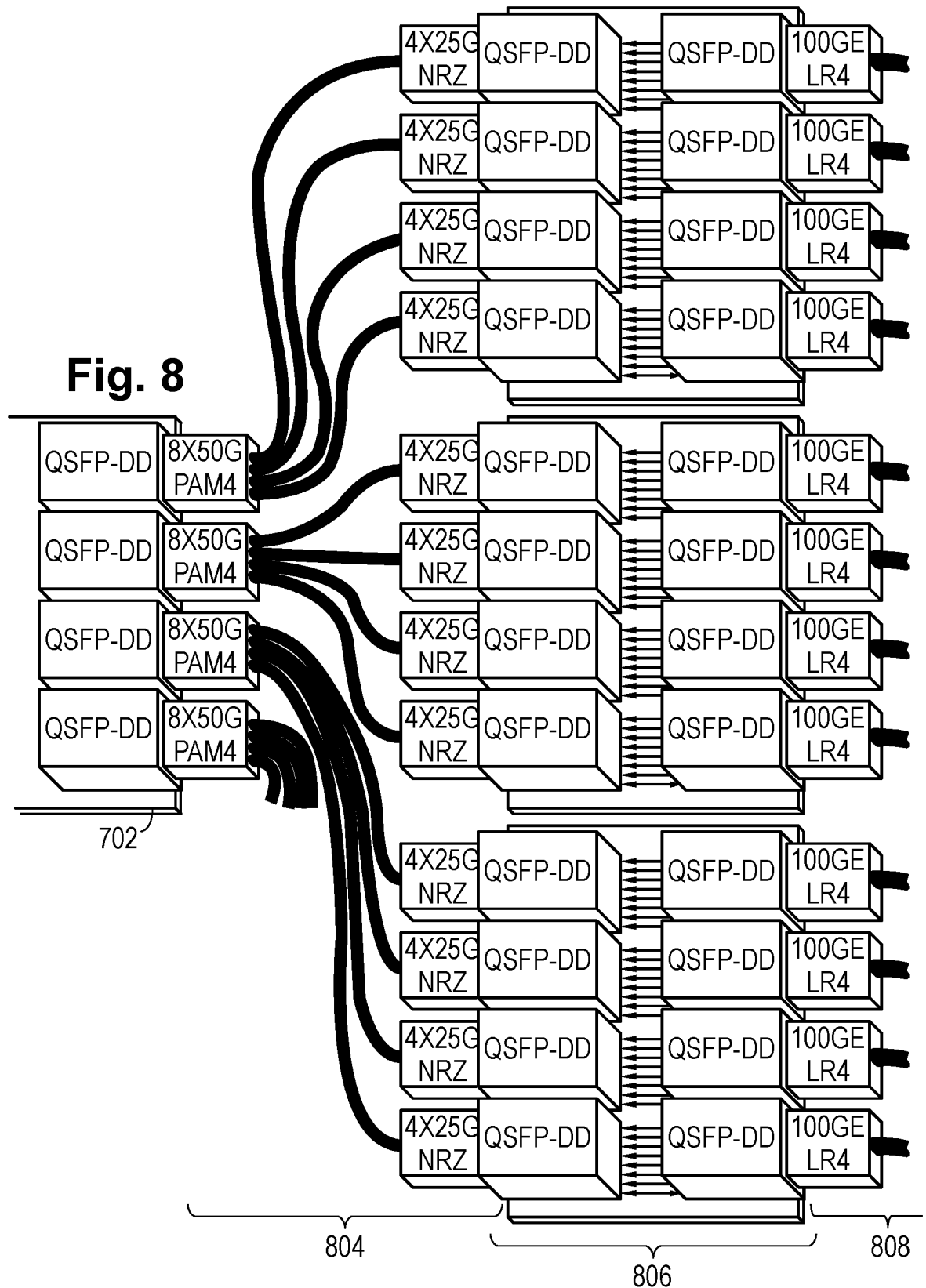

PLUGGABLE PATCH PANEL

TECHNICAL FIELD

The present disclosure relates to network rack elements (e.g., network routers, switches, bridges) having limited ports for network cable connectors and optical transceivers, and more particularly, to devices and methods for relaxing the limits on such ports.

BACKGROUND

Demand for ever-higher bandwidths and computing capabilities has given rise to massive data centers—facilities having network servers, storage, switches, and routers by the thousands arranged in rows of rack cabinets in a building having a suitable power and cooling infrastructure. Interconnections between the network components and connections to external networks such as the Internet are provided by network cables inserted into the appropriate ports on the components' faceplates.

The EIA-310 standard (now maintained by the Electronic Components Industry Association) standardizes the dimensions for the rack cabinets, and the network component manufacturers accordingly size their products to fit the standardized rack dimensions. The standard defines the height of components in terms of standard rack units (abbreviated as RU or simply U, which is 1.75 inches=44.45 mm). Network components are commonly sized to occupy whole number multiples of the rack units, e.g., 1 U, 2 U, 3 U, etc. (A typical full size cabinet will hold 42 U of network components.) This standardization of dimensions provides modularity, facilitating replacement and rearrangement of individual components.

As communications technology continues to evolve, successive generations of network components, optical transceivers, and cables are developed to support ever-higher performance levels and bandwidths. The mismatch in capabilities between new equipment and existing facilities often force tradeoffs that disincentivize service providers from gradual upgrades, forcing them to wait until a sizeable fraction of their facilities can be upgraded all at once. Service providers regard this stairstep upgrade approach as undesirable.

SUMMARY

Accordingly, there are disclosed herein devices and methods that correct for a mismatch in network port capabilities of a network component and the desired network cable or optical transceiver capabilities, whether that mismatch relates to the power envelope, the thermal envelope, the bandwidth, or the signal constellation. Namely, there is disclosed herein a pluggable patch panel, i.e., a modular rack unit component that can be connected between the desired cable connectors or optical transceivers and the overmatched network ports of an existing router or other network component to meet the requirements for the desired connectors/transceivers while ensuring full utilization of the existing component's capabilities. In at least some cases, the pluggable patch panel minimizes cost and complexity by connecting associated ports with direct-connect traces that comply with the relevant chip-to-module attachment unit interface (AUI C2M) loss specifications of the IEEE 802.3 Standard (Ethernet Standard).

Using the language of the claims, an illustrative pluggable patch panel includes: a first set of network ports and a second set of network ports, each network port in the first set and the second set having contacts to accept an incoming data stream from an inserted pluggable module or active cable connector and contacts to provide an outgoing data stream to that pluggable module or active cable connector. The pluggable patch panel further includes circuit traces that directly connect incoming data stream contacts of each network port in the first set to the outgoing data stream contacts of a respective network port in the second set and that directly connect outgoing data stream contacts of each network port in the first set to the incoming data stream contacts of the respective network port in the second set.

In one variation the network ports of the pluggable patch panel each have a transceiver configured to convey an outgoing data stream to a network cable connector and an incoming data stream from that network cable connector. Each port in the first set is coupled to a respective port in the second set, with the outgoing data stream from each port in the first set representing the respective network port's incoming data stream and the incoming data stream to each port in the first set sourcing the respective network port's outgoing data stream.

One or more such pluggable patch panels may be employed in a network having at least one network element such as a network bridge, a network switch, and a network router. A set of network cables couple the first set of network ports to corresponding ports of the network element.

The foregoing pluggable patch panel and network may be combined with any one or more of the following optional features: 1. the network ports in the first set are configured for at least one connector type in the set consisting of: small form-factor pluggable (SFP), SFP+, SFP28, SFP56, SFP112, SFP double density (SFP-DD), quad small form-factor pluggable (QSFP), QSFP+, QSFP14, QSFP28, QSFP56, QSFP112, QSFP-DD, centum form-factor pluggable (CFP), CFP2, CFP4, and octal small form-factor pluggable (OSFP). 2. the pluggable patch panel further includes a chassis with the first and second sets positioned on a front panel, the chassis having standard 1 U or 2 U rack unit dimensions. 3. the chassis includes circuitry to connect each transceiver in the second set of network ports to the transceiver of the respective port in the first set of network ports without any intermediate circuitry that implements a network bridge, network switch, or network router. 4. the pluggable patch panel further includes a power supply and a cooling system providing an expanded power and thermal envelope for at least the second set of network ports as compared with the corresponding ports of the at least one network element. 5. the pluggable patch panel further includes a third set of network ports with each port in the first set coupled to a respective port in the third set, and internal circuitry that splits the incoming data stream to each port in the first set into separate outgoing data streams from the respective ports in the second set and third set and that forms the outgoing data stream from each port in the first set by merging incoming data streams to the respective ports in the second and third set. 6. the internal circuitry implements a 1:N breakout for each of the ports in the first set, with N greater than or equal to 2. 7. the transceivers of the ports in the first set employ a first data rate and a first channel signal constellation, wherein the transceivers of the ports in the second set employ a second data rate and a second channel signal constellation, and wherein at least one mismatch exists between the first and second data rate, and between the first and second signal constellation. 8. the network cables have only two network cable connectors. 9. the network cables are breakout cables with a unitary end connector coupled to N split end connectors, with N greater than 1. 10. at least one of the network cables has a first network cable connector that employs a first data rate and a first channel signal constellation, and a second network cable connector that employs a second data rate and a second channel signal constellation, and wherein at least one mismatch exists between the first and second data rate and between the first and second signal constellation.

BRIEF DESCRIPTION OF THE DRAWINGS

FIG. 5 is an illustrative front panel of a 1:2 breakout pluggable patch panel.
FIG. 6 is an illustrative front panel of a 1:4 breakout pluggable patch panel.
FIG. 7 is a schematic representation of a first pluggable patch panel configuration.
FIG. 8 is a schematic representation of a second pluggable patch panel configuration.

DETAILED DESCRIPTION

Figure 1:
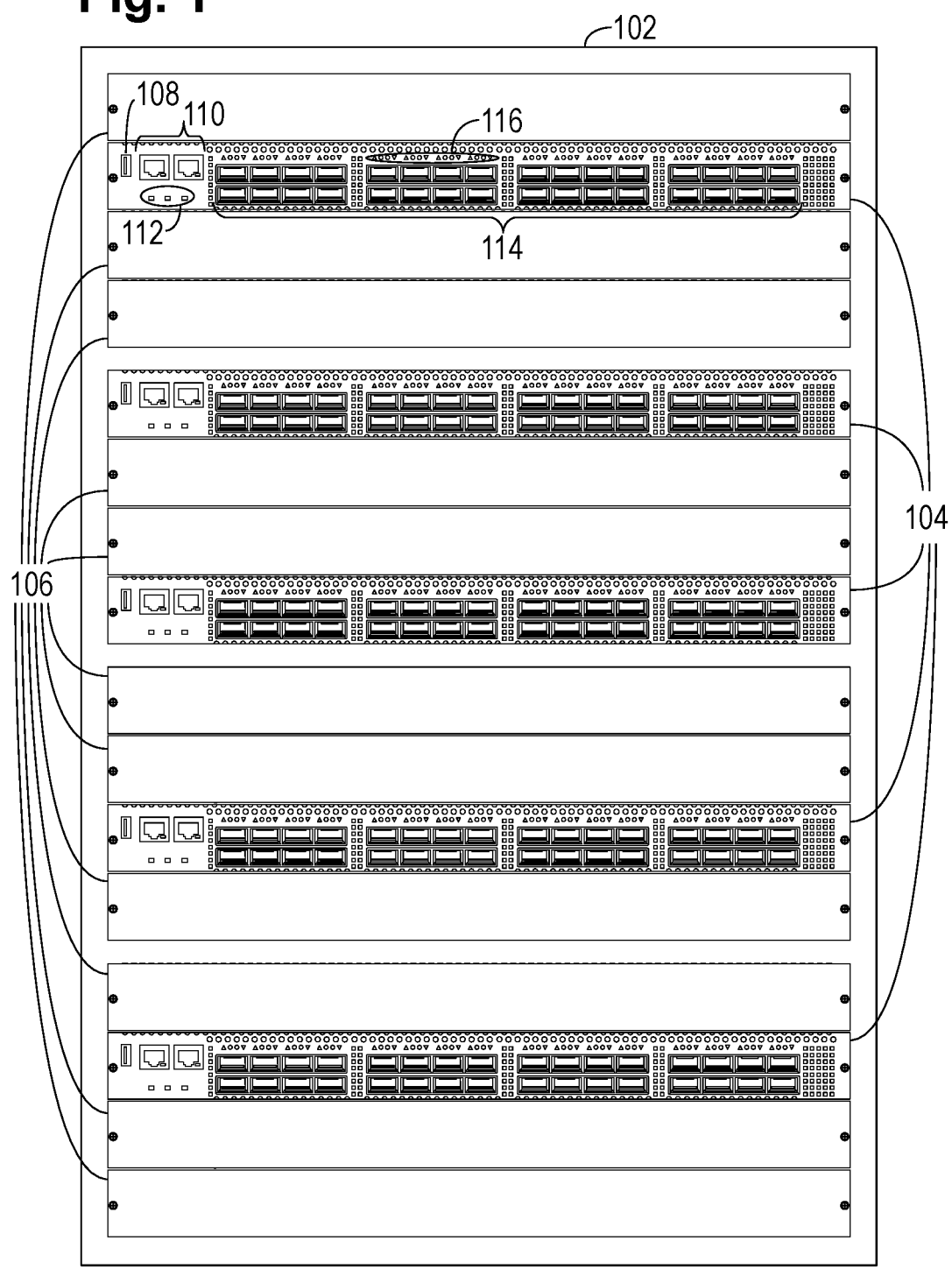
FIG. 1 is a front view of an illustrative rack cabinet having network components.

While specific embodiments are given in the drawings and the following description, keep in mind that they do not limit the disclosure. On the contrary, they provide the foundation for one of ordinary skill to discern the alternative forms, equivalents, and modifications that are encompassed in the scope of the appended claims.

For context, FIG. 1 shows an illustrative rack cabinet 102 having multiple network elements 104. In this figure, the illustrative network elements 104 are network routers, but can be any combination of routers, switches, bridges, servers, and storage. Unused bays are covered with blank faceplates 106. The illustrative routers 104 have a USB port 108, LAN ports 110, device buttons and indicators 112, pluggable module ports 114, and port status indicators 116. The USB port 108 provides an interface for diagnostics and firmware upgrades. LAN ports 110 accept Ethernet cable connectors for control plane communications, e.g., network traffic for system configuration, maintenance, and monitoring. Buttons and indicators enable control and monitoring of a device's power-on status. Network ports 114 couple any inserted cable connectors or pluggable module transceivers to internal electronics that provide the high bandwidth network router functionality for incoming and outgoing data streams. Indicators 116 are typically light-emitting diodes that illuminate or flash with appropriate colors or patterns to indicate whether the corresponding network port is actively conveying any data streams. Much of the faceplate is perforated to facilitate airflow for cooling internal electronics.

Network ports 114 may be configured to receive directly inserted network cable connectors, or optionally may receive pluggable module transceivers that in turn accept network cable connectors. The network cable connectors can be passive, or may themselves include powered transceivers for equalization and/or conversion between electrical and optical signals. The inserted network cable connectors or pluggable module transceivers preferably have a small form-factor pluggable (SFP) format or one of its related formats such as SFP+, SFP28, SFP56, SFP112, SFP double density (SFP-DD), quad small form-factor pluggable (QSFP), QSFP+, QSFP14, QSFP28, QSFP56, QSFP112, QSFP-DD, centum form-factor pluggable (CFP), CFP2, CFP4, and octal small form-factor pluggable (OSFP), each of which supports a standardized pinout and signaling protocol. The connectors for lower bandwidth, short-range cables can be passive, but the network cables supporting higher bandwidths and longer ranges typically require the use of pluggable module transceivers or active cable connectors that incorporate transceivers. The pluggable module transceivers or active cable connectors draw power from the port connector and rely on the host device to provide adequate heat dissipation and/or active airflow or cooling for the transceiver electronics. The network routers or other network elements will generally specify a maximum power and thermal budget or envelope for powering and cooling the pluggable module transceiver and connector electronics. The transceiver power and cooling load requirements will vary based on bandwidth and cable length, and is typically highest for long range, high bandwidth optical transceivers. If the power and cooling requirements of the pluggable module transceivers and inserted cable connectors exceeds the host device's power and thermal budget, the host device's performance will be impaired. Some of the ports will need be disabled or operated at lower bandwidths, thereby wasting a significant fraction of the network element's capacity and possibly that of the attached transceivers.

In other words, network routing and switching devices and the links that connect them are inextricably tied, creating financial and operational challenges as network providers seek to match capacity demands while preserving or lowering their Total Cost of Ownership (TCO). Specific areas where these challenges come to light include: excessive power and cooling loads of latest generation pluggable optical transceivers on the host network elements; mismatch between a) the optimal optical transceiver for a given link's bandwidth and reach requirement, and b) the port capabilities of the network element hosting that optical transceiver; growing complexity of the host network element to support management capabilities of the pluggable optical transceivers. In view of these challenges, there is proposed herein a novel solution to decouple a pluggable module transceiver's functional capacity, power draw, heat load, and management requirements from the network element's port capacity, power source, cooling sink, and operating system. This decoupling will improve overall network performance while enabling more rapid network element upgrades to the highest performing, most cost-efficient platforms independent of the pluggable transceivers typically required to meet the needs of the network provider and their customers.

This decoupling is accomplished through the use of an external faceplate device, herein termed a "pluggable patch panel", that may powered, cooled, and managed, independently of the network element. The pluggable patch panel has the resources to satisfy the requirements of pluggable module transceivers and transceivers of active cable connectors and can itself be coupled to the network element using relatively low-powered network cables that minimize the network element's power draw and heat load. In some implementations, 1:N breakout cables (N>1) can couple each port of the network element to multiple pluggable patch panel ports, enabling newer, higher-bandwidth network elements to be fully utilized without requiring the older, lower bandwidth transceivers and patch panels to be replaced.

Conversely, breakout cables could couple each pluggable patch panel port to multiple network element ports, enabling newer, higher-bandwidth transceivers and patch panels to be fully utilized without requiring older, lower bandwidth network elements to be replaced. Some contemplated pluggable patch panel implementations would incorporate the 1:N breakout functionality internally, merging incoming data streams for multiple ports into an outgoing data stream on a single port and splitting the incoming data stream on that port into multiple outgoing data streams for the multiple ports. By excluding any network routing, switching, or bridging functionality, the pluggable patch panels can be implemented inexpensively using fixed internal routing.

Independently of, or together with, the breakout functionality, a bit-multiplexing function (commonly called a gearbox function) may be implemented by the low-powered network cables or internally within the pluggable patch panel. Bit-multiplexing functionality entails a change in the bit rate of the data stream combined with a change in the number of bus lanes, entails a change in the channel signal constellation, and/or entails error correction with or without a change to the forward error correction (FEC) encoding. Thus, for example, one connector of a gearbox cable may provide and accept 8 lanes of non-return to zero (NRZ) symbol streams at 50 Gbps while the connector at the other end provides and accepts 4 lanes of four-level pulse amplitude modulation (PAM4) symbol streams at 50 Gbps or, as another example, 8 lanes of PAM4 symbol streams at 25 Gbps or, as yet another example, 16 lanes of NRZ symbol streams at 25 Gbps. When combined with breakout functionality, the data lanes from a unitary end connector may be distributed among multiple split-end connectors.

Figure 2:
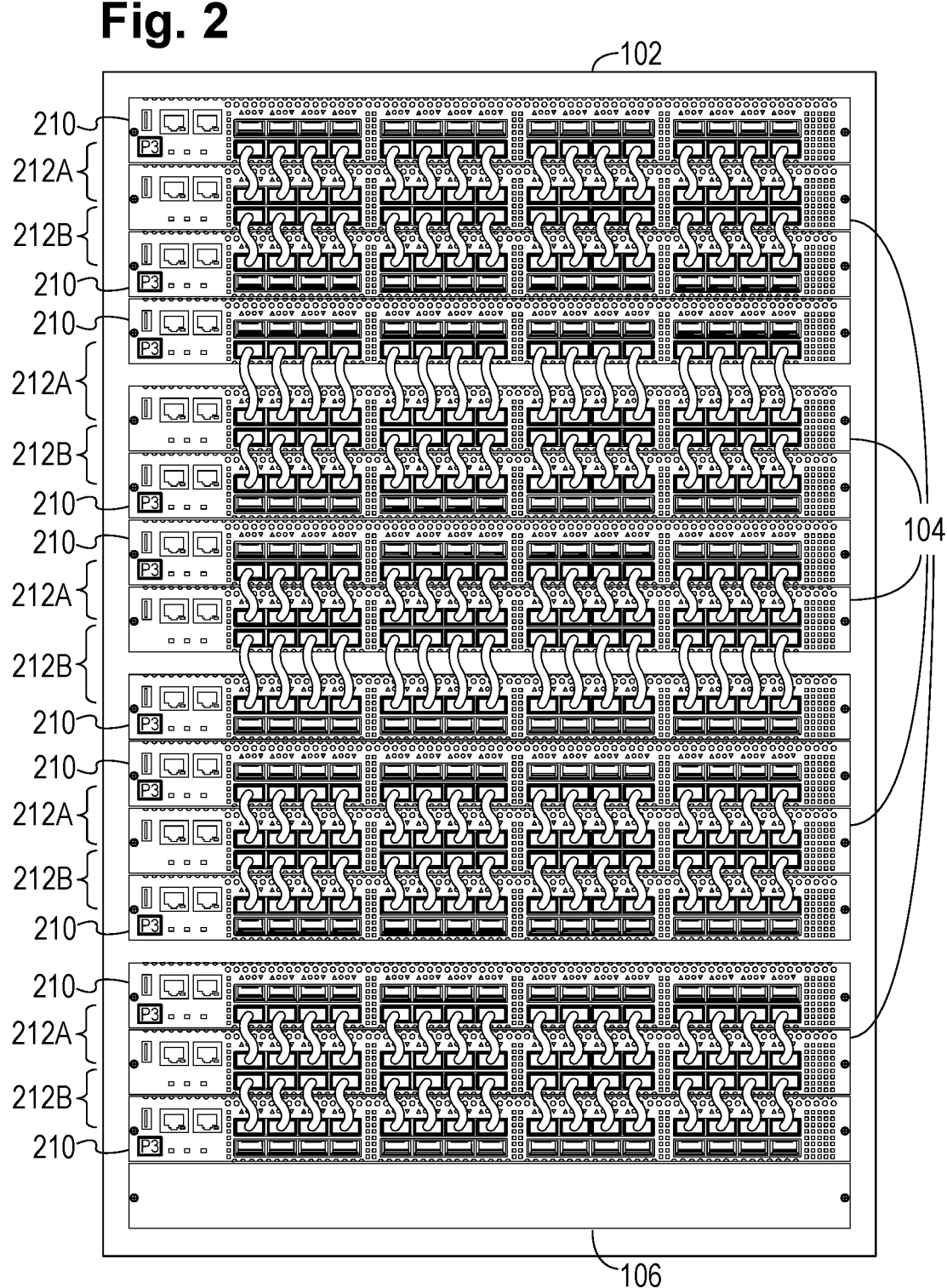
FIG. 2 is a front view of an illustrative rack cabinet with pluggable patch panels.

Accordingly, FIG. 2 shows an illustrative rack cabinet 102 having multiple network elements 104, each of which is supplemented with two pluggable patch panels 210 that are each sized to fit within one rack unit (1 U). (The illustrated pluggable patch panels are visually similar to network routers, with a corresponding number of ports for USB, LAN, and pluggable connectors.) A first set of short network cables 212A connects the lower network ports of a first pluggable patch panel 210 to the upper network ports of the network router 104, while a second set of short network cables 212B connects the lower network ports of the network router 210 to the upper network ports of a second pluggable patch panel 210. This arrangement minimizes the length of the router-extender connections, and converts each network port of the routers 104 into corresponding network ports of the pluggable patch panels 210. The pluggable patch panels 210 can be provided with a power and cooling budget that is enhanced relative to the routers to support higher power requirements and cooling loads of cable connector or pluggable module transceivers. Thus, for example, pluggable transceivers for a high bandwidth long-range optical cable can be inserted into the pluggable patch panels, which couple them to corresponding network ports of the routers while isolating the routers from the pluggable transceivers' power and cooling demands.

The configuration of FIG. 2 is merely illustrative. The pluggable patch panels can be sized differently, e.g., occupying more or less rack cabinet space and providing a larger or smaller number of network ports. The patch panels may be concentrated in one portion of the cabinet rather than being interspersed among the network elements. The patch panels may be placed in adjacent rack cabinets to better isolate the network elements from the increased power and heat loads of the patch panels, or even in a different portion of the building or even further, in different buildings better equipped to cope with the patch panels' power and cooling needs. In many cases, only a subset of the network ports in a given router may need to be connected to a pluggable patch panel; the remaining network ports may have a sufficient power and cooling budget to enable direct connection of the desired cable connectors or pluggable module transceivers.

Figure 3:
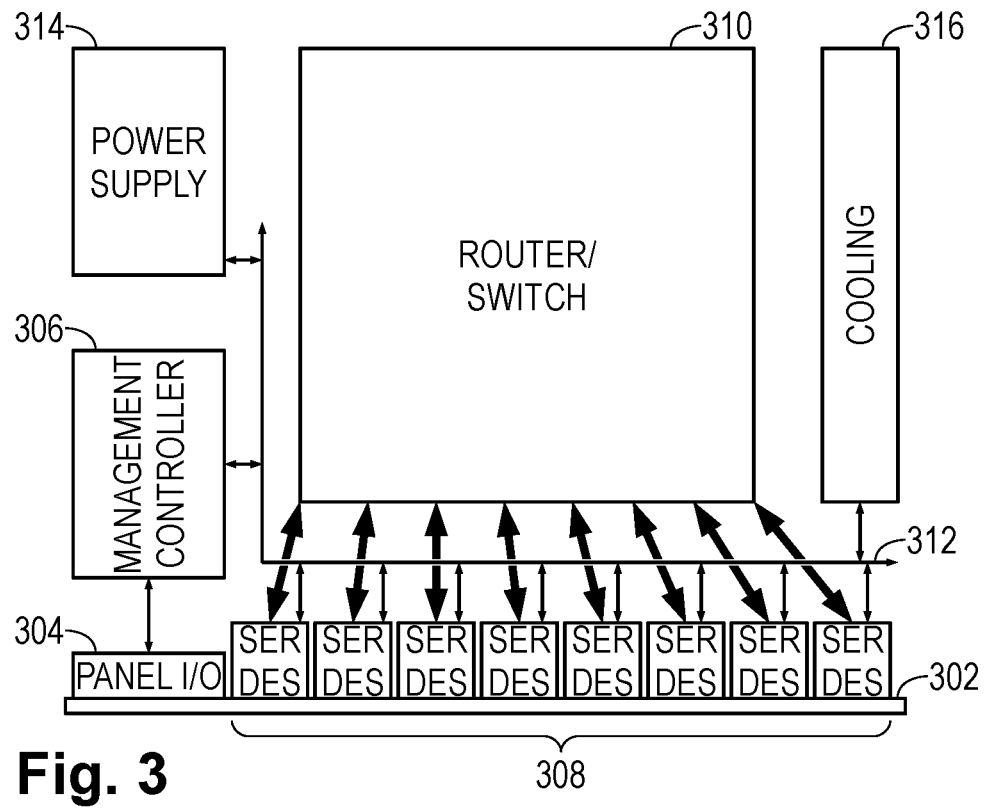
FIG. 3 is a function block diagram of an illustrative network component.

FIG. 3 is a block diagram of an illustrative router having a front panel with a faceplate 302, a panel input/output module 304, and an array of serializer/deserializer (SerDes) modules 308 to convey outgoing and incoming data streams to and from inserted cable connectors. The SerDes modules may provide retiming and, as explained elsewhere, may provide bit multiplexing functionality. The panel input/output module 304 may include a printed circuit board that holds buttons, indicator LEDs, a USB port, and LAN jacks in an accessible position on the faceplate 302, and connects each of them to a microprocessor that implements the functionality of a management controller 306.

The array of SerDes modules 308 may be mounted on a separate printed circuit board that connects the array to an application specific integrated circuit (ASIC) network router or switch 310. A control bus 312 couples the management controller 306 to the router or switch IC 310, a power supply 314, and a cooling module 316, enabling the management controller 306 to read and write control registers of the various components or otherwise control and monitor their operation. The management controller 306 includes the computational, memory, and storage hardware necessary to run the desired control plane software. The control bus may be a serial communications bus (e.g., 12C) that services all of the transceivers and enables the network operator to control the transceiver operation from via the LAN ports from a central management system.

Figure 4:
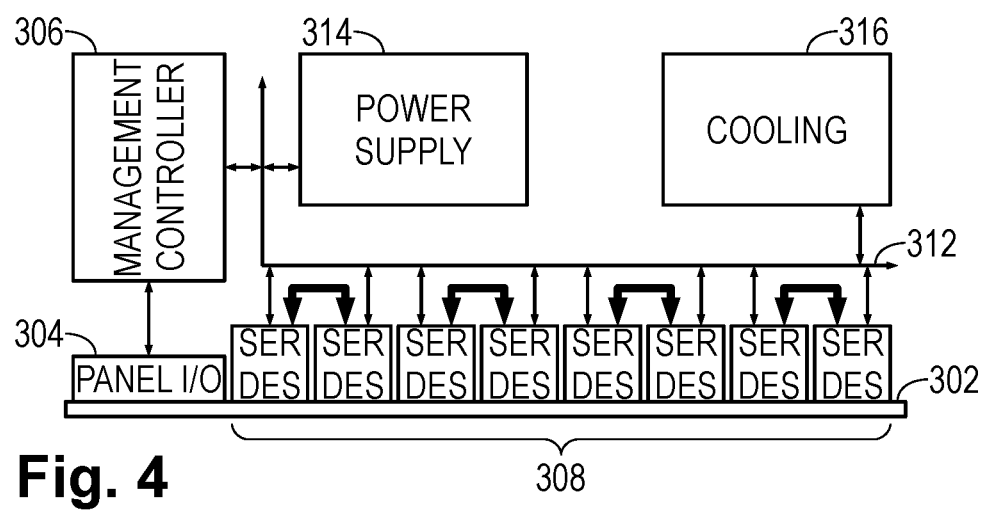
FIG. 4 is a function block diagram of an illustrative pluggable patch panel.

Byway of contrast, FIG. 4 is a block diagram of an illustrative pluggable patch panel. It includes the front panel with faceplate 302, panel input/output module 304, management controller 306, array of SerDes modules 308, control bus 312, power supply 314, and cooling module 316. The pluggable patch panel omits any network router or switch IC 310, instead providing fixed wiring connections between corresponding SerDes modules 308. In FIG. 4, each SerDes module 308 is coupled to one other SerDes module 308 in a 1:1 relationship, so that the incoming and outgoing data streams for a given module respectively correspond to outgoing and incoming data streams of another module. In another contemplated variation, the SerDes modules are also omitted, and the pluggable patch panel provides direct-connection traces between the pins of the associated network ports. The direct-connection traces are designed to comply with the chip-to-module attachment unit interface (AUI C2M) loss specifications of the relevant IEEE 802.3 (Ethernet) Standard to enable direct communication between the attached transceivers of the pluggable modules or active cable connectors. This simplified architecture is expected to substantially reduce manufacturing costs relative to network elements such as routers, switches, and bridges.

In an alternative configuration, the pluggable patch panels may implement breakout and/or bit multiplexing functionality. FIG. 5 is a block diagram of a pluggable patch panel that provides 1:2 breakout mapping between a unitary SerDes module 502 and two split SerDes modules 504, such that the multiple lanes of incoming data stream to each unitary SerDes module 502 are divided among two split SerDes modules 504 to provide two outgoing data streams, and the incoming data streams to the two split SerDes modules 504 are merged to form the outgoing data stream of the unitary SerDes module 502. FIG. 6 is a block diagram of a pluggable patch panel that provides 1:4 breakout mapping between each unitary SerDes module 502 and four split SerDes modules 604. Other 1:N breakout mappings are also contemplated.

FIG. 7 shows an illustrative cable configuration for a subset of the network element ports 702. The illustrated network ports are for QSFP-DD pluggable connectors supporting at least 400 Gbps data streams. The short cables 704 transport eight lanes of 25 Gbps PAM4 signals in each direction, but may have minimal power requirements due to the short range. The pluggable patch panel provides direct internal coupling between paired QSFP-DD ports 706, conveying the incoming and outgoing data streams between the short cables 704 and network connectors for long range optical transceivers, in this case extended reach transceivers that convey 400 Gbps Ethernet with a range potentially up to or exceeding 500 km (400GE ZR+). The power and cooling loads of the 400GE ZR+ transceivers are imposed on the pluggable patch panel ports rather than on the network element ports. In some contemplated implementations, the pluggable patch panel provides direct wiring between the cages for accepting the pluggable module transceivers or active cable connectors, transferring incoming and outgoing data streams between the attached transceivers without any intermediate electronics such as retimers or bit-multiplexers. Pluggable module transceivers or cable connectors for Active Electrical Cable (AEC) or Active Optical Cable (AOC) can link directly to each other using a standard chip to module (C2M) interface interconnection on a passive patch panel (or any other adapter that provides direct connections via electrical traces that fall within the C2M loss specification). Since these contemplated implementations are transparent to the high speed signals, they can support different operating speeds so long as the incoming and outgoing transceiver speeds are matched on the paired ports.

FIG. 8 shows another illustrative cable configuration for the subset of network port elements 702. The short cables 704 are replaced with 1:4 breakout cables having four split ends each supporting 100 Gbps data stream in each direction, labeled here as four lanes of 25 Gbps NRZ data streams. The pluggable patch panel provides multiple sets of paired QSFP-DD ports to couple the split end data streams to pluggable connectors for long range four-channel 100 Gbps Ethernet with an approximately 10 km range (100GBASE-LR4). In addition to decoupling the power and cooling load of the optical transceivers from the network element ports, the pluggable patch panel ensures the network element ports are operating at their optimal capacity without necessitating replacement of the existing optical cabling or legacy optical transceivers that may already be located at client sites.

The short cables 212, 704, 804 can be active cables, or in some contemplated implementations, may be passive cables without powered transceivers in the connectors. Active cables may provide embedded retimers and optionally bit-multiplexing functionality. The short cables may be copper or optical cables, either 1:1 cables or 1:N breakout cables with N>1. Additional detail for implementing breakout/gearshift functionality in the cables can be found in co-owned U.S. Pat. No. 11,018,709 ("Active 1:N Breakout Cable"), which is hereby incorporated herein by reference. This additional detail is readily applicable to implementing the same functionality internal to the pluggable patch panels.

In one contemplated implementation, the network element is a multi-port 400 G router such as an UFISpace S9710-76D which supports up to 36 400 G ports but has a thermal budget that is limited to about 12 W per port. A network provider who wishes to preserve their (or their customer's) legacy 100 G optics equipment generally cannot afford to operate the router ports at 100 G speeds because such low speeds cannot be justified at the typical cost per port. Nor can the provider upgrade all the legacy equipment to 400 G optics as the thermal load would exceed the cooling capability of the network element. At least some of the router ports would need to be left unused, thereby wasting a substantial fraction of the router's capability. A pluggable patch panel can be used to resolve both scenarios. In the first case, the network provider may use Credo 400 G QSFP-DD-4xQSFP28 SHIFT cables, plugging the 400 G end into the S9710-76D ports and plugging the QSFP28s end into the pluggable patch panel. The legacy optical transceivers (such as QSFP28 100GBASE-LR4 optic) may be plugged into the paired network ports on the pluggable patch panel. In the second case, the network provider can plug a Credo 400 G QSFP-DD CLOS or SPAN AEC between the network element ports and the pluggable patch panel ports, and plug 400 G ZR+ long range optical transceivers into the paired pluggable patch panel ports. The costs of the short cables and pluggable patch panels are expected to be negligible as compared with the cost of the high end network elements and 400 G ZR+ pluggable optical transceivers.

The disclosed pluggable patch panels may offer a number of potential advantages: offloading pluggable optical transceiver power and cooling loads from the network element to the pluggable patch panel by using low-cost, low power connector cable; offloading pluggable (or active cable) optical transceiver power and cooling loads from one rack or facility to a separate rack or facility by using low-cost, low power connector cable; providing bit multiplexing functions in either the connecting cable or the pluggable patch panel to efficiently support older generation optics and lower speed connections with the new network element operating at full-capacity per port; providing bit multiplexing functions in either the connecting cable or the pluggable patch panel to support newer generation optics at higher speed connections from older generation networking elements; offloading management and diagnostic monitoring of pluggable optical transceivers from the network element to the pluggable patch panel.

Numerous alternative forms, equivalents, and modifications will become apparent to those skilled in the art once the above disclosure is fully appreciated. For example, the disclosed principles are applicable to both current and yet-to-be-commercialized port speeds using NRZ, PAM4, and larger signal constellations. It is intended that the claims be interpreted to embrace all such alternative forms, equivalents, and modifications that are encompassed in the scope of the appended claims.

What is claimed is:

1. A pluggable patch panel that comprises:
   a first set of network ports;
   a second set of network ports, each network port in the first set and the second set having contacts to accept an incoming data stream from an inserted pluggable module or active cable connector and contacts to provide an outgoing data stream to that pluggable module or active cable connector; and
   circuit traces that directly connect incoming data stream contacts of each network port in the first set to the outgoing data stream contacts of a respective network port in the second set and that directly connect outgoing data stream contacts of each network port in the first set to the incoming data stream contacts of the respective network port in the second set to enable direct communication between the pluggable modules or active cable connectors attached to the respective network ports without any intermediate electronics.

2. The pluggable patch panel of claim 1, wherein the network ports in the first set and the second set are configured for at least one connector type in a set consisting of: small form-factor pluggable (SFP), SFP+, SFP28, SFP56, SFP112, SFP double density (SFP-DD), quad small form-factor pluggable (QSFP), QSFP+, QSFP14, QSFP28, QSFP56, QSPF112 QSFP-DD, centum form-factor pluggable (CFP), CFP2, CFP4 and octal small form-factor pluggable (OSFP).

3. The pluggable patch panel of claim 1, further comprising a chassis with the first and second sets positioned on a front panel, the chassis having standard 1U or 2U rack unit dimensions.

4. The pluggable patch panel of claim 3, further comprising:
a power supply and a cooling system; and
a network management controller coupled to the first and second sets of network ports to monitor operation of the inserted pluggable modules or active cable connectors.

5. A network comprising:
at least one network element in a set consisting of a network bridge, a network switch, and a network router;
a pluggable patch panel that includes:
a first set of network ports;
a second set of network ports, each network port in the first set and the second set having contacts to accept an incoming data stream from an inserted pluggable module or active cable connector and contacts to provide an outgoing data stream to that pluggable module or active cable connector; and
circuit traces that directly connect incoming data stream contacts of each network port in the first set to the outgoing data stream contacts of a respective network port in the second set and that directly connect outgoing data stream contacts of each network port in the first set to the incoming data stream contacts of the respective network port in the second set; and
a set of network cables that couples the first set of network ports to corresponding ports of the at least one network element.

6. The network of claim 5, wherein the network ports in the first set and the second set are configured for at least one connector type in a set consisting of: small form-factor pluggable (SFP), SFP+, SFP28, SFP56, SFP112, SFP double density (SFP-DD), quad small form-factor pluggable (QSFP), QSFP+, QSFP14, QSFP28, QSFP56, QSPF112 QSFP-DD, centum form-factor pluggable (CFP), CFP2, CFP4 and octal small form-factor pluggable (OSFP).

7. The network of claim 5, further comprising a chassis with the first and second sets positioned on a front panel, the chassis having standard 1U or 2U rack unit dimensions.

8. The network of claim 7, wherein the pluggable patch panel further comprises:
a power supply and a cooling system providing an expanded power and thermal envelope for at least the second set of network ports as compared with the corresponding ports of the at least one network element.

9. The network of claim 5, wherein the network cables have only two network cable connectors.

10. The network of claim 5, wherein the network cables are breakout cables with a unitary end connector coupled to N split end connectors, with N greater than 1.

11. The network of claim 5, wherein at least one of the network cables has a first network cable connector that employs a first data rate and a first channel signal constellation, and a second network cable connector that employs a second data rate and a second channel signal constellation, and wherein at least one mismatch exists between the first and second data rate and between the first and second signal constellation.

12. A pluggable patch panel that comprises:
a first set of network ports; and
a second set of network ports, each network port in the first set and the second set having a transceiver configured to convey an outgoing data stream to a pluggable module or network cable connector and an incoming data stream from that pluggable module or network cable connector,
each network port in the first set coupled to a respective network port in the second set,
the outgoing data stream from each network port in the first set representing the respective network port's incoming data stream and the incoming data stream to each network port in the first set sourcing the respective network port's outgoing data stream,
wherein the pluggable patch panel further comprises:
a chassis with the first and second sets positioned on a front panel, the chassis having standard 1U or 2U rack unit dimensions, the chassis including circuitry to connect each transceiver in the second set of network ports to the transceiver of the respective port in the first set of network ports without any intermediate circuitry that implements a network bridge, network switch, or network router;
a power supply and a cooling system; and
a network management controller coupled to the transceivers of the first and second sets of network ports.

13. The pluggable patch panel of claim 12, wherein the network ports in the first set and the second set are configured for at least one connector type in a set consisting of: small form-factor pluggable (SFP), SFP+, SFP28, SFP56, SFP112, SFP double density (SFP-DD), quad small form-factor pluggable (QSFP), QSFP+, QSFP14, QSFP28, QSFP56, QSPF112 QSFP-DD, centum form-factor pluggable (CFP), CFP2, CFP4 and octal small form-factor pluggable (OSFP).

14. The pluggable patch panel of claim 12, further comprising:
a third set of network ports with each port in the first set coupled to a respective port in the third set; and
internal circuitry that splits the incoming data stream to each port in the first set into separate outgoing data streams from the respective ports in the second set and third set, and that forms the outgoing data stream from each port in the first set by merging incoming data streams to the respective ports in the second and third set.

15. The pluggable patch panel of claim 14, wherein the internal circuitry implements a 1:N breakout for each of the ports in the first set, with N greater than 2.

16. The pluggable patch panel of claim 12, wherein the transceivers of the ports in the first set employ a first data rate and a first channel signal constellation, wherein the transceivers of the ports in the second set employ a second data rate and a second channel signal constellation, and wherein at least one mismatch exists between the first and second data rate and between the first and second signal constellation.

17. An adapter that comprises:
    a first network port and a second network port each having contacts to accept an incoming data stream from an inserted pluggable module or active cable connector and contacts to provide an outgoing data stream to that pluggable module or active cable connector; and
    circuit traces that directly connect incoming data stream contacts of the first network port to the outgoing data stream contacts of the second network port and that directly connect outgoing data stream contacts of the first network port to the incoming data stream contacts of the second network port to enable direct communication between the pluggable module or active cable connector inserted in the first network port and the pluggable module or active cable connector inserted in the second network port without any intermediate electronics.

18. The adapter of claim 17, wherein the first network port and the second network port are each configured for at least one connector type in a set consisting of: small form-factor pluggable (SFP), SFP+, SFP28, SFP56, SFP112, SFP double density (SFP-DD), quad small form-factor pluggable (QSFP), QSFP+, QSFP14, QSFP28, QSFP56, QSPF112 QSFP-DD, centum form-factor pluggable (CFP), CFP2, CFP4 and octal small form-factor pluggable (OSFP).

19. The adapter of claim 18, further comprising:
    a power supply to supply power to the inserted pluggable module or active cable connector in each of the first network port and the second network port.

20. The adapter of claim 18, further comprising:
    a cooling system to provide airflow to the inserted pluggable module or active cable connector in each of the first network port and the second network port.

21. The adapter of claim 18, further comprising:
    a network management controller coupled to the first network port and the second network port to monitor operation of the inserted pluggable modules or active cable connectors.

* * * * *